United States Patent [19]

Eiberger

[11] Patent Number: 5,475,423
[45] Date of Patent: Dec. 12, 1995

[54] FILM SCANNER WHICH DOUBLY SCANS TO CORRECT FOR FILM SPEED AND POSITION ERRORS

[75] Inventor: Berthold Eiberger, Ober-Ramstadt, Germany

[73] Assignee: U.S. Philips Corporation, New York, N.Y.

[21] Appl. No.: 159,020

[22] Filed: Nov. 29, 1993

[30] Foreign Application Priority Data

Dec. 10, 1992 [DE] Germany .......................... 42 41 529.2

[51] Int. Cl.$^6$ ........................................... H04N 3/38
[52] U.S. Cl. ........................................ 348/97; 348/106
[58] Field of Search ............................... 348/96, 97, 104, 348/106, 214; H04N 3/36, 5/253, 3/38

[56] References Cited

U.S. PATENT DOCUMENTS 4,903,131  2/1990  Lingemann et al. .................... 358/214

5,023,711  6/1991  Erhardt .................................. 348/96 X

FOREIGN PATENT DOCUMENTS

| 2191061 | 12/1987 | Germany | H04N 3/38 |
| 3736789 | 5/1989 | Germany | H04N 3/38 |
| 3736790 | 5/1989 | Germany | H04N 3/38 |
| 2272595 | 5/1994 | Germany | H04N 3/36 |
| 2165417 | 4/1986 | United Kingdom | H04N 5/253 |

*Primary Examiner*—Joseph Mancuso
*Assistant Examiner*—Wendy R. Greening
*Attorney, Agent, or Firm*—Edward Blocker

[57] ABSTRACT

In a film scanner for optically scanning a film for obtaining a picture signal, which film is moved at a constant speed, an image position correction which is as motion-independent as possible, is ensured in that the film scanner at least doubly scans at least parts of each film image and determines image position errors by comparing the two scanning signals of the same nominal image content, and corrects the picture signal in dependence upon the determined image position error.

16 Claims, 2 Drawing Sheets

FILM SCANNER WHICH DOUBLY SCANS TO CORRECT FOR FILM SPEED AND POSITION ERRORS

BACKGROUND OF THE INVENTION

The invention relates to a film scanner for optically scanning a film for obtaining a picture signal, which film is moved at a substantially constant speed.

A problem in such film scanners is that the image position in the electronic picture signal is not constant. The cause of this problem may reside in mechanical irregularities of the film, but also, for example in speed fluctuations.

Different methods of image position stabilization are known, which use, for example the film perforations for this purpose (DE-A-37 36 790), or the image boundaries of the film. A film scanning arrangement is known from British Patent Application GB-A-2,165,417 in which an image position correction is performed with reference to a comparison of successive images of a film. However, the problem of this method is that successive film images are not necessarily equal due to motions which are present in the image. It is true that it may be attempted to detect motion present in the image, but this will never be a completely successful operation.

SUMMARY OF THE INVENTION

It is an object of the invention to provide a film scanner using image position correction which obviates the above-mentioned problems.

According to the invention, this object is solved in that the film scanner at least doubly scans at least parts of each film image, and determines image position errors by comparing the two scanning signals of the same nominal image content, and corrects the picture signal in dependence upon the determined image position errors.

Thus, the single film images are utilized for image position correction, i.e. only signals are used which are gained from the same film image; a comparison of successive film images is not necessary. This method precludes the role of motion in the film content and cannot disturb the image position correction.

If parts of a film image are doubly scanned in a given distance with respect to time or location, the two scanning signals must have a given correlation with each other. For example, in the case of a given local offset of the two scanning procedures, the second scanning signal should provide the same content after a given period of time as was previously provided by the first scanning signal. A comparison between the two scanning signals, or correlation of these two signals, may directly lead to a detection of image position errors and the picture signal can be corrected accordingly.

A further advantage of the invention is a great accuracy, because each time only a single film image is used for image position correction while tolerances between the film images do not play a role. The image position correction may be performed without a considerable time delay and particularly without using picture memories. It is insensitive to motions in the image contents and to erroneous measurements during scene transitions of the image contents of the film.

To correct the image position, it may be sufficient to doubly scan only parts of a film image so as to detect its position and to perform a corresponding correction. However, an even greater accuracy can be achieved when, for example the total image is doubly scanned. Moreover, different errors in the image position in the different image areas can then be detected. For a greater accuracy, it is also possible to perform a multiple scanning operation in which the film is scanned more frequently than twice.

An embodiment of the invention is characterized in that two line sensors arranged at a predetermined distance from each other are provided for double scanning. At a predetermined film speed and a known distance between the two sensors, these sensors, with a given offset with respect to time, should yield the same scanning signal. If these signals deviate from each other, or if the time offset is larger or smaller than it actually should be at a predetermined film speed, the presence of an image position error may thereby be directly detected.

In accordance with a further embodiment of the invention, this double scanning operation may be realized in that two scanning sensors and one beam splitter arrangement are provided, which arrangement is adapted in such a way that the two sensors scan the film with a defined local offset.

Sensors divided into a plurality of partially overlapping sub-sensors are used in some known film scanners. In a further embodiment of the invention, these overlapping sensors may be advantageously used for double scanning. Additional sensors are therefore not required for double scanning in these film scanners.

In accordance with a further embodiment of the invention, a delay member is provided which delays the first scanning signal by $$\tau = \frac{Y_0}{V_0},$$

with respect to time at a speed $V_0$ of the film and a double scanning over a distance $Y_0$ in the direction of travel of the film, while an arrangement is provided which compares the first delayed scanning signal with the second scanning signal, a motion estimation being performed preferably by means of a block-matching method, yielding motion vectors dependent on which the image position errors in the picture signal are corrected by means of a correction element.

If the delay $\tau$ of the first scanning signal is performed in accordance with the above equation, the delayed first and the undelayed second scanning signal should be equal when there is a correct film speed or a correct image position. However, if this is not the case, the two signals deviate from each other. To evaluate this deviation, known methods of motion estimation may be performed, for example block-matching methods. The methods yield motion vectors for a group of pixels of the electronic picture signal, which vectors indicate in how far the pixels in the two scanning signals have moved. This motion directly provides a measure of the image position error. With the aid of these motion vectors this image position error in the electronic picture signal can then also be corrected.

In accordance with a further embodiment of the invention the film scanner divides each film image into predetermined areas, and determines, from a plurality of motion vectors determined for an area, a motion vector which is valid for the complete area, while the image position correction for the complete area is performed with reference to the common motion vector.

Due to this combination of complete areas of a film image, or a plurality of pixels in the area of a film image, a motion vector which is valid for these combined pixels or for the complete area can be determined from several motion vectors, which motion vector is further used for image position correction. In this way the number of components for further processing or correcting the image position error may be reduced. Since locally adjacent areas of a film image or locally adjacent pixels in the electronic picture signal are most probably subject to a similar image position error, this combination of the motion vectors hardly degrades the result, but the computation effort is clearly reduced.

In accordance with a further embodiment of the invention, the film scanner determines and corrects the image position errors in the direction of travel of the film and in the direction perpendicular to the direction of travel.

The strongest image position errors are mostly produced in the direction of travel of the film due to film speed fluctuations, incorrect speed or fluctuations of the distances between the images on the film, or other imperfections of the film material. However, image position errors in a direction perpendicular to the direction of travel of the film also occur. These errors may also be corrected in the film scanner according to the invention, likewise as the image position errors in the direction of travel. The two scanning signals obtained during double scanning may be separately evaluated for the image position errors in the two directions and a corresponding correction may be performed separately for the two directions.

A further embodiment of the invention is characterized in that the film scanner determines, from the determined vectors indicating image position errors in the film travel direction, a correction signal for the image size of the film images in the film travel direction, and corrects this image size accordingly.

If an erroneous image position is detected by the vectors determined for the film travel direction and indicating the corresponding image position errors, its cause resides in a film speed which at least for this film image is incorrect. The cause may either be a generally incorrect film speed, or an inconstant distance between the images on the film. In any case, this also results in an incorrect size of the image in the electronic picture signal for the single film image in the case of an incorrect film speed. At a too high speed the image is too small, at a too low speed it is too large. This correction of the image size, in addition to the correction of the image position error, may advantageously be performed by the film scanner according to the invention, because the vectors determined can also be directly used for this purpose.

In a further embodiment of the invention, a correction signal for adapting the film speed can be obtained from the vectors determined for image position errors in the direction of travel of the film. However, this adaptation of the film speed should be effected only with relatively large time constants of several seconds so as to avoid irregular film travel and possibly additional new errors.

These and other aspects of the invention will be apparent from and elucidated with reference to the embodiments described hereinafter.

DETAILED DESCRIPTION OF THE PREFERRED EMBODIMENTS OF THE INVENTION

Figure 1:
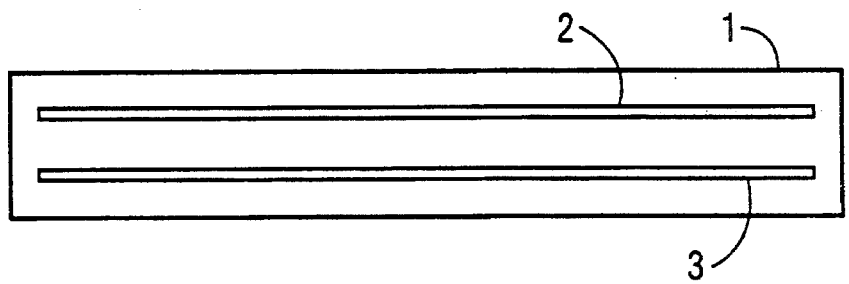
FIG. 1 shows a first embodiment of a sensor arrangement for double scanning by the film scanner according to the invention.

A sensor arrangement 1 shown in FIG. 1 comprises a first line sensor 2 and a second line sensor 3. These two sensors are arranged at a predetermined distance from each other on the sensor arrangement 1. A film, which is not shown in FIG. 1, is transported transversely to the direction in which the two sensors extend so that the two line sensors 2 and 3 consecutively scan equal parts of each film image; thus, a locally offset double scanning operation is performed. These two scanning signals supply the same scanning signal with a time offset which depends on the local distance between the two line sensors 2 and 3 on the arrangement 1. After correction of this time offset the two signals can be compared with each other and image position errors may be detected.

Figure 2:
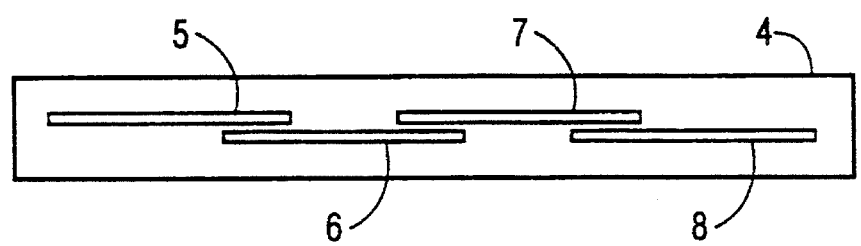
FIG. 2 shows a second embodiment of a sensor for double scanning.

FIG. 2 shows a second embodiment of a sensor suitable for double scanning. The sensor arrangement 4 shown in FIG. 2 is a conventional sensor arrangement of the type used in many film scanners. The sensor arrangement 4 has four sensors 5, 6, 7 and 8, two of which partially overlap each other. In known film scanners this overlapping is quasi-eliminated. However, the overlapping areas of the sensors 5 to 8 may be used in the film scanner according to the invention for doubly scanning each film image in these areas and for using these two scanning signals thus obtained for the purpose of image position correction. When using a sensor arrangement according to FIG. 2, additional components, at least at the sensor side, are not required for the image position correction according to the invention.

Figure 3:
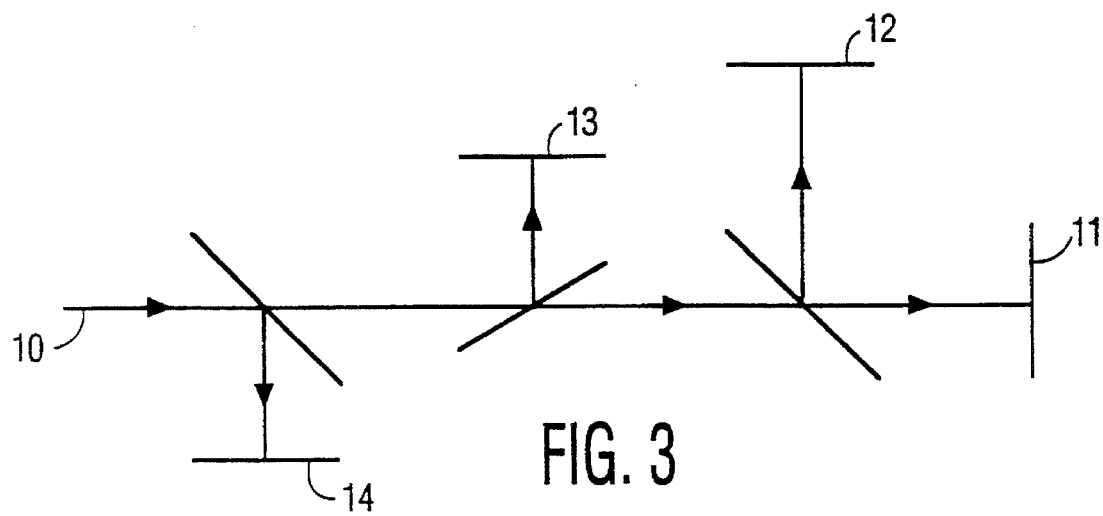
FIG. 3 shows diagrammatically a radiation path in a film scanner for realizing the double scanning.

FIG. 3 shows diagrammatically a radiation path in a film scanner, as may be provided for scanning the film and simultaneously for double scanning for the purpose of image position correction. FIG. 3 shows diagrammatically the optical light signal 10 passing through several beam splitters and being incident on sensors 11, 12, 13 and 14. For example, the sensor 11 is the one which supplies the luminance signal. The sensor 13 may supply, for example the blue color signal and the sensor 14 may supply the red color signal. Either RGB signals or the luminance signal and two color difference signals may then arbitrarily be obtained from these signals. A further sensor 12 which also supplies a luminance signal is provided for the film scanner according to the invention, using image position correction. However, the radiation path is such that the sensor 12 scans the film and hence each film image with a given local offset relative to the scanning point of the sensor 11.

The sensors 11 and 12 thus supply two scanning signals which, with a given time-offset, should be identical at the known speed of the film and at the known local offset of the scanning points of the sensors 11 and 12. This is not the case with an incorrect image position and the deviation of the two signals may be used for image position correction.

Figure 4:
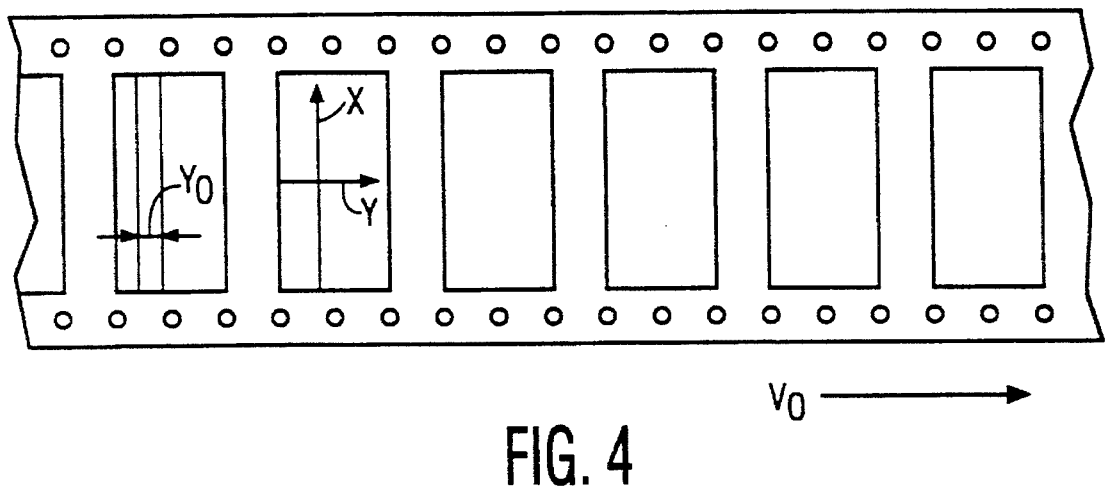
FIG. 4 shows diagrammatically a section of a film to be scanned and FIG. 5 is a block diagram of a film scanner for evaluating the two scanning signals and for image position correction.

FIG. 4 shows diagrammatically a part of a film to be scanned by the film scanner according to the invention. The scanning operation may be performed, for example by means of one of the arrangements of FIGS. 1 to 3. The principal direction in which the single film images on the film extend is transverse to the longitudinal direction of the film and hence transverse to the transport direction. In the following description of the determination and correction of image position errors it is assumed that the film is transported into its longitudinal direction at a nominal speed $V_0$. The film is scanned transversely to the transport direction. The direction transverse to the transport direction is denoted as the X direction within the single image and the direction parallel to the transport direction is denoted as the Y direction. In a film image as shown in FIG. 4, two scanning operations over a mutual distance of $Y_0$ are performed within one film image. This double scanning operation yields two signals whose evaluation will be further explained hereinafter with reference to FIG. 5.

Figure 5:
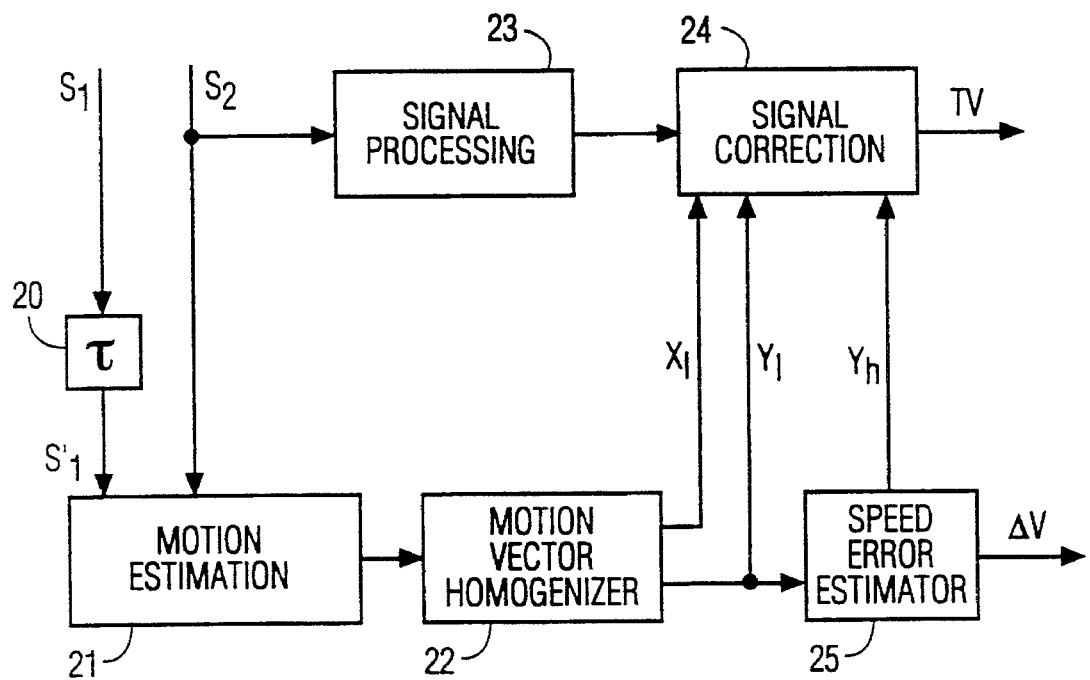

The two double scanning operations in a film image shown in FIG. 4 over a local distance of $Y_0$ have the result that at a given speed $V_0$ the two picture signals should be equal with a given time-offset. To this end the first scanning signal, which is denoted by $S_1$ in FIG. 5, is delayed by means of a delay member 20 by a value of $$\tau = \frac{Y_0}{V_0},$$

After this delay the delayed signal $S'_1$ should be identical to the undelayed second scanning signal $S_2$. In the arrangement of the film scanner shown diagrammatically in FIG. 5 these two signals are applied to a circuit block 21 in which these signals are evaluated as to the presence of motion. A large number of motion estimation methods is known, of which methods preferably a block-matching method can be used in which the relative motion of a given group of adjacent pixels of the scanning signals $S'_1$ and $S_2$ is determined by comparing each group of pixels of one signal with a corresponding group of pixels of the second signal, but this with an offset of several assumed motion vectors. In the case of motion in the image content, a group of pixels may then be found in the second signal which best correlates with the group of pixels in the first picture signal. This group has a given local distance to the group of the first picture signal. This local distance is the motion to which the group of pixels between the two scanning signals is subjected. This distance is generally denoted as motion vector and indicates the measure of the current motion within this group of pixels.

These motion vectors may be determined for the direction of travel of the film, but also for the direction transverse to the direction of travel, thus for the directions Y and X within the film images.

The circuit block 21 applies the corresponding vectors to an arrangement 22 which homogenizes the motion vectors for adjacent pixels, i.e. it fixes a common motion vector for a group of pixels, which motion vector is valid for all pixels of this group. This procedure does not cause any problems as regards image position correction, because it can be assumed that adjacent pixels also have similar image position errors.

Both for the X direction and for the Y direction, the arrangement 22 supplies corresponding correction signals $X_1$ and $Y_1$ which, dependent on the motion vectors determined, trigger a correction in the picture signal.

To this end the picture signal, which is obtained, for example from the output signal $S_2$ of the second scanning operation, is applied to a signal processing unit 23 and subsequently to a correction element 24. Such correction elements are widely known in studio techniques and are used for changing image size, image location, etc. The corresponding adjusting members in this correction element 24 are controlled by the signals $X_1$ and $Y_1$ of the arrangement 22. The image position can be corrected in this way.

The arrangement according to FIG. 5 further includes a circuit unit 25 for estimating the error of the speed $V_0$. The film speed or the deviation of this speed from a nominal film speed can be detected from the determined motion vectors in the direction of travel of the film, thus from the output signals $Y_1$ of the arrangement 22, because the vectors indicate a local offset which directly depends on the film speed $V_0$ or on the deviation of the real film speed from this predetermined speed. The circuit unit 25 may thus supply a signal $\Delta V$ which indicates this film speed deviation from the nominal film speed. Moreover, the circuit unit 25 supplies a signal $Y_h$ which is used for correcting the image size in the Y direction. In fact, an incorrect film speed results in a change of the size of the film images in the Y direction. The signal $Y_h$ is used for correcting this change of size.

The signal $Y_h$ is also applied to the correction element 24 in which a corresponding correction of the size is performed in the Y direction. At the output the correction element 24 supplies the electronic picture signal which has been corrected with respect to image position and possibly also with respect to size.

The block diagram of FIG. 5 shows that the film scanner according to the invention can perform these corrections directly with reference to the two scanning signals $S_1$ and $S_2$ obtained from a film image by means of double scanning. The number of circuit components required for this purpose is relatively small, while, in particular, no complete picture memories are required. Since the comparison of the two signals obtained by double scanning results from a film image or from equal parts of a film image, the image content with motion between the film images cannot disturb the image position correction.

I claim:

1. A film scanner for optically scanning a film for obtaining a picture signal, which film is moving at a substantially constant speed, characterized in that the film scanner doubly scans parts of each film image and determines image position errors by comparing the two scanning signals of the same nominal image content, and corrects the picture signal in dependence upon the determined image position error, and in that two line sensors (2, 3) arranged at a predetermined distance from each other are provided for double scanning.

2. A film scanner as claimed in claim 1, characterized in that the film scanner determines and corrects the image position errors in the direction of travel of the film and in the direction perpendicular to the direction of travel.

3. A film scanner for optically scanning a film for obtaining a picture signal, which film is moving at a substantially constant speed, characterized in that the film scanner doubly scans parts of each film image and determines image position errors by comparing the two scanning signals of the same nominal image content, and corrects the picture signal in dependence upon the determined image position error, and in that two scanning sensors (11, 12) and one beam splitter arrangement are provided, which arrangement is adapted in such a way that the two scanning sensors (11, 12) scan different parts of the film which are spaced from each other by a defined distance.

4. A film scanner as claimed in claim 3, characterized in that the film scanner determines and corrects the image position errors in the direction of travel of the film and in the direction perpendicular to the direction of travel.

5. A film scanner for optically scanning a film for obtaining a picture signal, which films is moving at a substantially constant speed, characterized in that the film scanner doubly scans parts of each film image and determines image position errors by comparing the two scanning signals of the same nominal image content, and corrects the picture signal in dependence upon the determined image position error, and in that a sensor arrangement (4) is provided which comprises a plurality of partially overlapping sensors (5, 6, 7, 8) and in that the overlapping sensor areas are used for double scanning.

6. A film scanner as claimed in claim 5, characterized in that the film scanner determines and corrects the image position errors in the direction of travel of the film and in the direction perpendicular to the direction of travel.

7. A film scanner for optically scanning a film for obtaining a picture signal, which film is moving at a substantially constant speed, characterized in that the film scanner doubly scans parts of each film image and determines image position errors by comparing the two scanning signals of the same nominal image content, and corrects the picture signal in dependence upon the determined image position error, and in that a delay member (20) is provided which delays the first scanning signal by $\tau = Y_0/V_0$, with respect to time at a speed $V_0$ of the film and a double scanning over a distance $Y_0$ in the direction of travel of the film, in that an arrangement (21, 22) is provided which compares the first delayed scanning signal with the second scanning signal, a motion estimation being performed preferably by means of a block-matching method, yielding motion vectors dependent on which the image position errors in the picture signal are corrected by means of a correction element (24).

8. A film scanner as claimed in claim 7, characterized in that the film scanner divides each film image into predetermined areas and determines, from a plurality of motion vectors determined for an area, a motion vector which is valid for the complete area, and in that the image position correction for the complete area is performed with reference to the common motion vector.

9. A film scanner as claimed in claim 8, characterized in that the film scanner determines and corrects the image position errors in the direction of travel of the film and in the direction perpendicular to the direction of travel.

10. A film scanner as claimed in claim 8, characterized in that the film scanner determines, from the determined vectors indicating image position errors in the film travel direction, a correction signal for the image size of the film images in the film travel direction, and corrects this image size accordingly.

11. A film scanner as claimed in claim 8, characterized in that the film scanner obtains a correction signal for adapting the film speed from the vectors determined for image position errors in the direction of travel of the film.

12. A film scanner as claimed in claim 10, characterized in that the film scanner obtains a correction signal for adapting the film speed from the vectors determined for image position errors in the direction of travel of the film.

13. A film scanner as claimed in claim 7, characterized in that the film scanner determines, from the determined vectors indicating image position errors in the film travel direction, a correction signal for the image size of the film images in the film travel direction, and corrects this image size accordingly.

14. A film scanner as claimed in claim 13, characterized in that the film scanner obtains a correction signal for adapting the film speed from the vectors determined for image position errors in the direction of travel of the film.

15. A film scanner as claimed in claim 7, characterized in that the film scanner obtains a correction signal for adapting the film speed from the vectors determined for image position errors in the direction of travel of the film.

16. A film scanner as claimed in claim 7, characterized in that the film scanner determines and corrects the image position errors in the direction of travel of the film and in the direction perpendicular to the direction of travel.

* * * * *